United States Patent
Demers

(10) Patent No.: US 7,508,390 B1
(45) Date of Patent: Mar. 24, 2009

(54) METHOD AND SYSTEM FOR IMPLEMENTING REAL TIME SOFT SHADOWS USING PENUMBRA MAPS AND OCCLUDER MAPS

(75) Inventor: Joseph E. Demers, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 371 days.

(21) Appl. No.: 10/921,019

(22) Filed: Aug. 17, 2004

(51) Int. Cl.
*G06T 15/40* (2006.01)
(52) U.S. Cl. ........................... 345/426; 345/422
(58) Field of Classification Search ............... 345/426, 345/422
See application file for complete search history.

(56) References Cited

U.S. PATENT DOCUMENTS

| | | | |
|---|---|---|---|
| 5,268,996 | A | 12/1993 | Steiner et al. |
| 5,490,240 | A | 2/1996 | Foran et al. |
| 5,742,292 | A | 4/1998 | Murata |
| 5,742,749 | A * | 4/1998 | Foran et al. ........... 345/426 |
| 5,767,858 | A | 6/1998 | Kawase et al. |
| 5,805,782 | A | 9/1998 | Foran |
| 5,880,736 | A | 3/1999 | Peercy et al. |
| 5,999,185 | A | 12/1999 | Kato et al. |
| 6,034,691 | A | 3/2000 | Aono et al. |
| 6,078,332 | A | 6/2000 | Ohazama |
| 6,208,361 | B1 | 3/2001 | Gossett |
| 6,252,608 | B1 | 6/2001 | Snyder et al. |
| 6,876,362 | B1 | 4/2005 | Newhall, Jr. et al. |
| 6,903,741 | B2 | 6/2005 | Corbetta |
| 2004/0239673 | A1 * | 12/2004 | Schmidt ........... 345/426 |

OTHER PUBLICATIONS

Watt et al., "Advanced Animation and Rendering Techniques Theory and Practice", ACM Press, 1992, pp. 155-177.*
Reeves et al., Rendering Antialiased Shadows with Depth Maps, ACM, 1987, pp. 283-291.*
Agrawala et al., Efficient Image-Based Methods for Rendering Soft Shadows, Siggraph '00: Proceedings of the 27th Annual Conference on Computer Graphics and Interactive Techniques, ACM Press, 2000, 375-384.*
"Computer Graphics Principles and Practices", by J. Foley and A. Van Dam, 2nd Edition.
"Computer Graphics", by Donald Hearn and M. Pauline Baker, 2nd Edition, 1994.
"Direst Volume Rendering with Shading via Three-Dimensional Textures" by Gelder and Kim, IEEE, 1996.
"Vertex Shader Shadow Volume" NVIDIA Effect Browser.
Bergeron; A General Version of Crow's Shadow Volumes; IEEE Interactive Computer Graphics and Application; Sep. 1986.
Blin; Me and My (Fake) Shadow, pp. 82-86.
Crow; Shadow Algorithms for Computer Graphics; pp. 242-248.
Diefenbach; "Pipeline Rendering: Interactive Refractions, Relections, and Shadows"; pp. 173-180.
Dietrich, "Shadow Techniques", GDC 2001 Presentation, before Apr. 3, 2002.

(Continued)

*Primary Examiner*—Kee M. Tung
*Assistant Examiner*—Michelle K Lay

(57) ABSTRACT

A method for rendering a shadow in a 3 D scene includes generating a penumbra map using a z-buffer and generating an occluder map using the z-buffer. The penumbra map and the occluder map are projected into a 3 D scene to render at least one shadow having a penumbra region and an umbra region.

20 Claims, 7 Drawing Sheets

OTHER PUBLICATIONS

Fernando, P., Adaptive Techniques for Hardware Shadow Generation, pp. 1-94.
Williams; "Casting Curvered Shadows on Curved Surfaces".
Heckbert et al., Simulating Soft Shadows with Graphics Hardware; Technical Report CMU-CS-97-104.
Hubert, Casting Shadows on Volumes; Game Developer, vol. 6.
Ronald Frazier; "Real-Time Per-Pixel Point Lights and Spot Lights in OpenGL"; Sep. 13, 2000.
Kilgard., 'Improving Shadows and Reflection via the Stencil Buffer', www.nvidia.com/developer.
Mitchell, J., Shaders, Mar. 2005, pp. 1-41.
Nealen, Andrew, Shadow Mapping and Shadow Volumes, pp. 1-10.
Pago, C., Multiple-Depth Shadow Maps, pp. 1-8.
Udeshi et al., "Towards Interactive Photorealistic Rendering on Indoor Scenes: A Hybrid Approach" pp. 63-76.
Ronald Frazier; "Advanced Real-Time Per-Pixel Point Lights and Spot Lights in OpenGL"; Sep. 13, 2000.
Ronald Frazier; "Index Cube Shadow Mapping in OpenGL", Sep. 13, 2000.
Sander et al., "Silhouette Clipping"; pp. 327-334.
Parker et al.; Single Sample Soft Shadows.

* cited by examiner

METHOD AND SYSTEM FOR IMPLEMENTING REAL TIME SOFT SHADOWS USING PENUMBRA MAPS AND OCCLUDER MAPS

FIELD OF THE INVENTION

The field of the present invention relates to computer graphics. More particularly, the present invention relates to rendering operations in a computer graphics processing pipeline.

BACKGROUND OF THE INVENTION

Recent advances in computer performance have enabled graphic systems to provide more realistic graphical images using personal computers and home video game computers. In such graphic systems, a number of procedures are implemented to render, or draw, graphic primitives to the display of the system. A "graphic primitive" is a basic component of a graphic picture, such as a polygon. All graphic pictures are formed with combinations of these graphic primitives. Many procedures may be utilized to perform such graphics rendering.

Rendering realistic shadows greatly increases the realism of an overall 3 D scene. In real-time 3 D rendering applications, the realistic rendering of shadows cast by 3 D objects (e.g., characters, trees, buildings, etc.) increases the sense of immersion one obtains during interaction with the scene. Nearly all modern 3 D graphics pipelines include some amount of dedicated hardware/software for implementing some degree of shadow rendering. Shadow rendering, as with texture mapping, is an important improvement to rendering techniques that attempt to increase the realism of 3 D shaded objects.

The problem with shadow rendering is that it greatly complicates the calculations the 3 D pipeline must perform. For real-time 3 D rendering applications, the location of light sources, the different types of light sources, and their effect on the shading calculations of the 3 D objects in the scene must be computed in real-time (e.g., 30 frames per second or more).

For example, in comparison to shading calculations, the geometric relationship between the light source, the surface, and the viewer are processed to determine the correct shade for a given polygon for a pixel. The shading calculations can be done separately for each pixel on each polygon. Therefore, shading calculation time is proportional to the total number of pixels all the polygons project onto from the camera's point of view. However with shadow calculations, the geometric relationship between the surface being rendered and the light source and all intervening objects must be evaluated. Thus, if the number of polygons in a given scene increases, the amount of processing work that has to be performed for each pixel increases as well. Thus, as users increasingly demand realism and immersion from 3 D applications, the scene complexity increases, thereby imposing much greater processing burdens on graphics computer systems. This is especially so with real-time 3 D rendering applications.

Because of this large processing burden, a number of prior art "shortcut" shadow rendering algorithms have been developed. Each of these algorithms implement some means to reduce the amount of brute force processing required to generate pseudo-realistic shadows for a 3 D scene. Generally, less expensive algorithms produce simple, less realistic shadows, while more expensive algorithms yield somewhat more realistic shadows.

For example, some simpler prior art shadow rendering algorithms may implement shading but not shadows. In those algorithms which do render shadows, there are often "special controls" for minimizing the complexity of the shadow problem. There may be surface attributes which allow control regarding whether polygons cast or receive shadows. There may also be shadow-casting attributes for light sources, where the attributes serve to speed up the calculation process by eliminating "unnecessary" calculations from the rendering.

Thus, prior art real-time shadow rendering applications (e.g., z-buffer algorithms, and the like) render shadows without penumbras for the sake of maintaining real-time rendering capabilities (e.g. frames per second). Shadows produced by prior art 3 D rendering programs are generally simplified unrealistic shadows. While the simplifications allow shadow rendering to be performed in real time, they also result in distracting image errors, such as, for example, shadows with incorrect penumbras, without penumbras at all, or shadows with aliased borders.

For example, a realistically rendered shadow should have a penumbra surrounding an umbra, where there is a gradual change in intensity through the penumbra between the fully lit region and umbra. Although shadows can vary tremendously as a function of the lighting environment, the relative size of the umbra/penumbra should accurately reflect the function of the size of the light source and its distance from the object. Such effects determine the quality of a rendered shadow, and enable a viewer to infer information concerning the nature of the light source, and enable a more realistic perception of the three-dimensional environment. For example, the shadows that one would see outdoors depend on the time of day and whether the sky is overcast or not. Realistic, real-time, shadow rendering that maintains frame rate performance as scene complexity increases is generally beyond the capability of prior art real time 3 D rendering.

SUMMARY OF THE INVENTION

Embodiments of the present invention provide a method and system for implementing shadow rendering in a 3 D scene. Embodiments of the present invention significantly reduce the amount time required to implement realistic shadow effects. Embodiments of the present invention provide a more efficient and more realistic shadow rendering algorithm that minimizes any compromises in shadow rendering image quality while maintaining real-time rendering capabilities.

In one embodiment, the present invention is implemented as a GPU (graphics processor unit) based method for rendering a shadow in a 3 D scene. The method includes generating a penumbra map per light using a z-buffer (e.g., for depth information) and generating an occluder map per light using the z-buffer. The penumbra map and the occluder map are projected from the light into a 3 D scene to render shadows having a penumbra region and an umbra region.

In one embodiment, the penumbra map comprises a z surface of the penumbra region and the occluder map comprises the z value (e.g. depth) of the occluder that the z surface of the penumbra region was created from. Shading calculations can be performed (e.g., by the GPU) to render the shadow(s) of the 3 D scene, wherein the shading calculation comprises a ratio of the difference between a penumbra depth and an object depth to the difference between an occluder depth and the object depth. The object depth generally corresponds to a light space depth (e.g., distance from the light source from which the occluder produces the shadow).

In this manner, embodiments of the present invention produce a soft shadow rendered 3 D scene, where the form and appearance of the shadow can realistically vary as a function of the lighting environment (e.g., the object size, object depth, etc.), and where the relative size of the umbra/penumbra accurately reflect the size and shape of the light source. Embodiments of the present invention implement shadow rendering with accurate penumbras in real time.

BRIEF DESCRIPTION OF THE DRAWINGS

The present invention is illustrated by way of example, and not by way of limitation, in the Figures of the accompanying drawings and in which like reference numerals refer to similar elements.

DETAILED DESCRIPTION OF THE INVENTION

Figure 1:
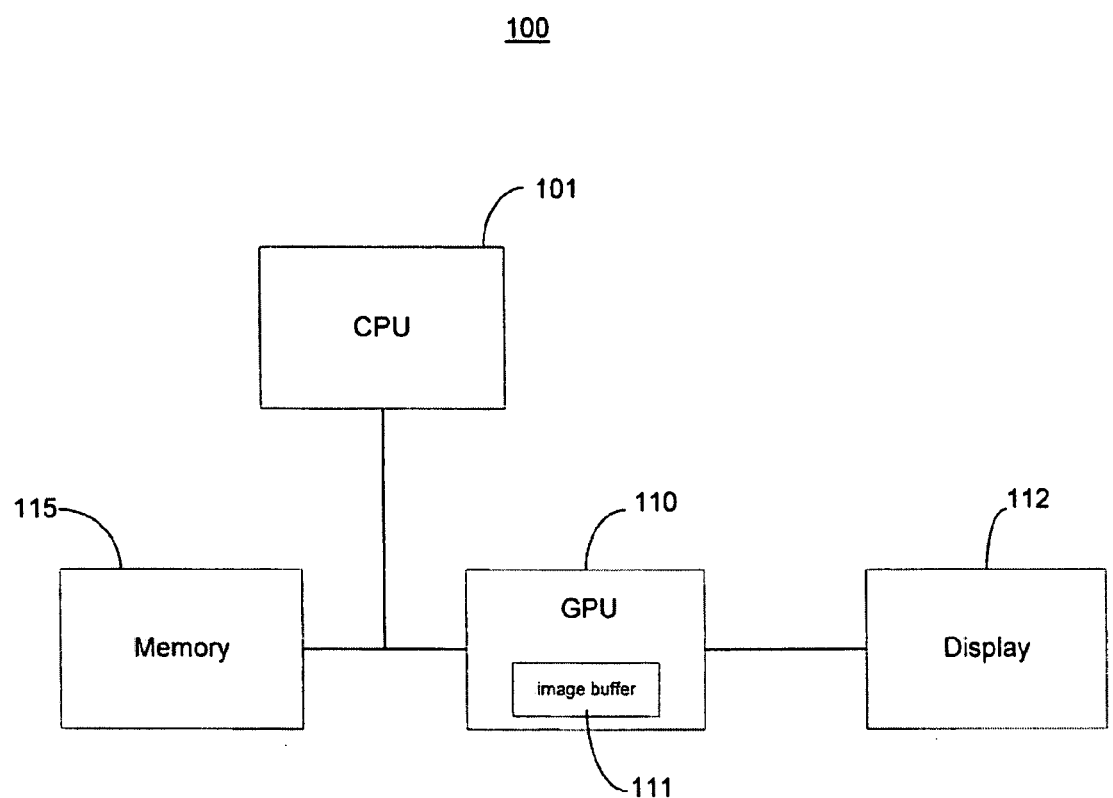
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention provide a method and system for implementing shadow rendering in a 3 D scene. Embodiments of the present invention significantly reduce the time required to render realistic shadow effects. Embodiments of the present invention provide a more efficient and more realistic shadow rendering algorithm that minimizes any compromises in shadow rendering image quality while maintaining real-time rendering capabilities. Embodiments of the present invention and their benefits are further described below.

Notation and Nomenclature

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "mapping" or "accessing" or "walking" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform

With reference now to FIG. 1, a computer system 100 in accordance with one embodiment of the present invention is shown. Computer system 100 shows the components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 100) and are executed by the processor (e.g., CPU 101 or GPU 110) of system 100. When executed, the instructions cause the computer system 100 to implement the functionality of the present invention as described below.

In general, computer system 100 comprises at least one central processor unit (CPU) 101 coupled to a system memory 115 and a graphics processor unit (GPU) 110 via one or more busses as shown. The GPU 110 includes one or more image buffers 111 (e.g., frame buffer, z-buffer, shadow buffer, etc.) used in an image rendering process. A display 112 is shown coupled to the GPU 110. As shown in FIG. 1, system 100 shows the basic components of a computer system platform that implements the functionality of the present invention. Accordingly, system 100 can be implemented as, for example, a desktop computer system or server computer system, having a powerful general-purpose CPU 101 coupled to a dedicated graphics rendering GPU 110. In such an embodiment, components would be included that are designed to add peripheral buses, specialized graphics memory and system memory, IO devices, and the like.

Additionally, it should be appreciated that although the GPU 110 is depicted in FIG. 1 as a discrete component, the GPU 110 can be implemented as a discrete graphics card designed to couple to the computer system via a graphics port (e.g., AGP port, or the like), as a discrete integrated circuit die (e.g., mounted directly on the motherboard), or as an integrated GPU included within the integrated circuit die of a computer system chipset (e.g., integrated within the Northbridge chip). Similarly, system 100 can be implemented as a set-top video game console device such as, for example, the Xbox®, available from Microsoft Corporation of Redmond Wash.

Figure 2:
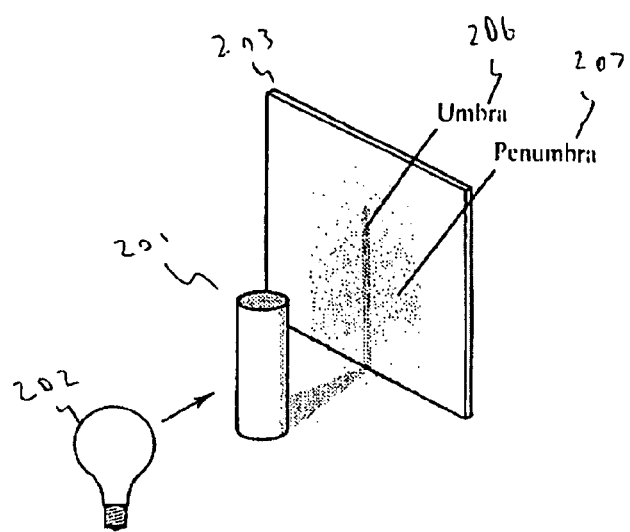
FIG. 2 shows diagram depicting a shadow as cast by and occluding object onto a second object in accordance with one embodiment of the present invention.

FIG. 2 shows diagram depicting a shadow as rendered by one embodiment of the present invention. As shown in FIG. 2, an object 201 casts a shadow from a light source 202 on to a second object 203. The shadow has a fully darkened inner component, referred to as an umbra 206. The shadow also has an outer component which ranges from fully darkened to fully lit, referred to as a penumbra 207. The size of the umbra 206 and the penumbra 207 vary as a function of the lighting environment. The shadow components 206-207 relative sizes (e.g., of the umbra/penumbra) are a function of the size and shape of the light source 202 (e.g., in this case illustrated as a light bulb) and its distance from the object 201. As the penumbra shrinks or grows, the shadow appears harder or softer edged.

Figure 3:
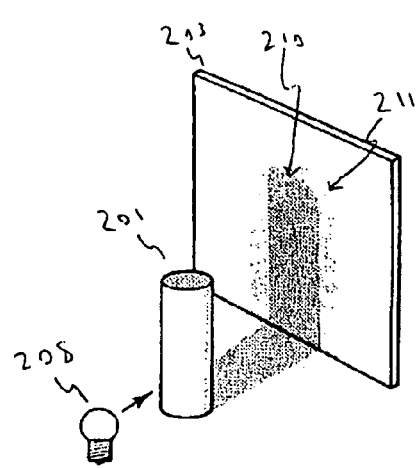
FIG. 3 shows a diagram of a different light source and occluding object as it casts a shadow on a second object in accordance with one embodiment of the present invention.

FIG. 3 shows a diagram of a different light source 208 and the object 201 as they cast a shadow on the object 203. As shown in FIG. 3, because the light source 208 is smaller than the light source 202 of FIG. 2, the umbra 210 is larger than the umbra 206. Additionally, the umbra 210 is larger with respect to the penumbra 211.

The umbra is that part of a shadow that is completely cut off from the light source, whereas the penumbra is an area that receives some light from the source. Thus, the umbra 210 is larger than the umbra 206. A penumbra surrounds an umbra, and in real life, there is always a gradual change in intensity within a penumbra from the umbra to the lit area. In computer graphics applications, light sources are generally categorized by type and are modeled according to the category for their type. For example, the common categories are "point lights" and "directional lights", light sources which are infinitely small and infinitely far away, respectively, produce umbrae with sharp edges. However, these lights are only approximations to real light sources, since no lights are infinitely small (of zero size) and no lights are infinitely far away. "Area lights" are a category that more accurately models real world lights, since they are both of measurable size, and measurable distance from the objects they light. These types of lights cast shadows with penumbras whose the size and softness are proportional to the size of the light and inversely proportional to the distance between the light and the object casting the shadow.

Figure 4:
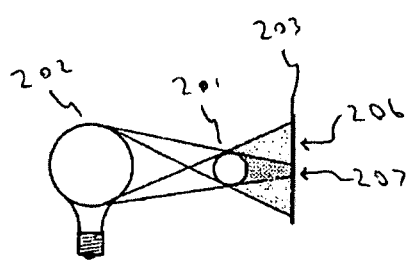
FIG. 4 shows a side view diagram of the shadow umbra and penumbra from the illustration of FIG. 2 in accordance with one embodiment of the present invention.

FIG. 4 shows a side view diagram of the shadow umbra and penumbra from the illustration of FIG. 1. In this depiction, it can be seen how the umbra 207 is that part of a shadow that is completely cut off from the light source 202, and how the penumbra 206 is that area that receives some light from the source 202.

Figure 5:
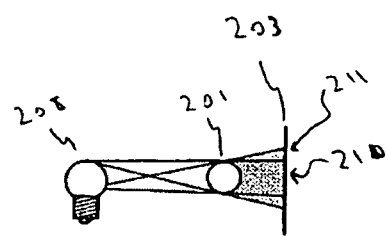
FIG. 5 shows a side view diagram of the shadow umbra and penumbra from the illustration of FIG. 3 in accordance with one embodiment the present invention.

FIG. 5 shows a side view diagram of the shadow umbra and penumbra from the illustration of FIG. 2. In this depiction, as described above, since the light source 208 is smaller than the light source 202, more of the light from the light source 208 is completely cut off, and thus, the umbra 210 is larger than the umbra 207.

FIG. 4 and FIG. 5 also illustrate the manner in which embodiments of the present invention render shadows for the 3 D scene. If the light sources 202 and 208 are accurately modeled, the area of the penumbra and umbra as projected onto the object 203 can be calculated and treated as a texture, and rendered accordingly onto the object 203. If the light source of a scene is a point light source, there is no penumbra to calculate and the shadow has a hard edge. However, for accurate modeling (e.g., simple point light sources are not realistic), the dimensions and intensities of the penumbra and umbra need to be calculated.

In real-time 3 D rendering, where the relative position of objects and light sources change, the shadows (e.g., each including an umbra and penumbra) have to be recalculated. In the prior art, because of the inefficiency of prior art shadowing algorithms, the high computational overhead on the 3 D rendering pipeline forced shadow rendering to be either ignored, or greatly simplified (e.g., point light sources, hard edges, rendering artifacts, etc.). In contrast, embodiments of the present invention enable realistic shadow rendering from realistic light sources. This enables the accurate rendering of shadows which enhance image quality in ways that enhance depth and movement perception. Embodiments of the present invention model the penumbra and umbra of a shadow as a penumbra texture and occluder texture, and utilize texture mapping and shading capabilities of the 3 D graphics pipeline (e.g., GPU 110) to perform shadow rendering accordingly.

Figure 6:
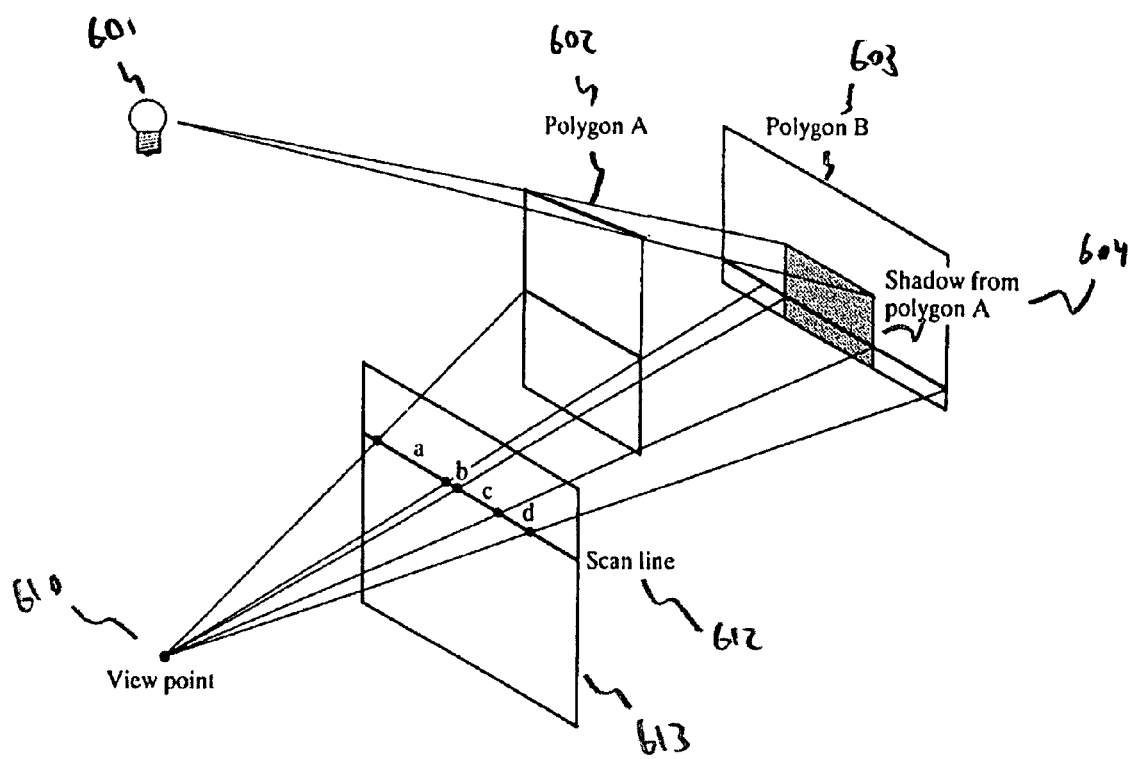
FIG. 6 shows a diagram depicting a scan line to show shadow effects as textures in accordance with one embodiment of the present invention.

FIG. 6 shows a diagram depicting a scan line 612 to show shadow effects as textures in accordance with one embodiment of the present invention. As shown in FIG. 6, the light source 601 interacts with polygon A 602 to cast a shadow 604 onto polygon B 603. Thus, from a viewpoint 610, a viewer would perceive a scan line 612 of an image plane 613. The scan line 612 would have components comprising scan line segments delineated by both view point projection boundaries and shadow boundaries. For example, as shown in FIG. 6, in segment "a" of scan line 612, polygon A is visible and is rendered accordingly, in segment "b", polygon B is visible and is rendered accordingly, in segment "c", polygon B is shadowed by polygon A and is rendered (e.g., shaded) at an appropriately reduced intensity, and in segment "d", polygon B is visible and is rendered accordingly.

In this manner, the shading intensity associated with the shadow effects can be processed as a 2 D texture and the texture mapping processes of the graphics pipeline can perform shading calculations to map the shadow onto an object.

In one embodiment, a realistic light source can be modeled by an array of point light sources and by adding shading contributions due to each point source. This results in the soft penumbra and umbra shadow effects.

In one embodiment, a shadow volume is computed by first evaluating the contour of all occluding objects, as seen from the light source. The volume is created by projecting these contours from the light source out through the scene. When rendering the scene, any polygons inside this volume are considered in shadow, and any polygons outside this volume are considered lit.

In one embodiment, a shadow texture is rendered from the light's point of view, using a standard z-buffer hidden surface removal algorithm. This texture contains the distance from the light to the closest occluding surface, as represented by the z-buffer used for hidden surface removal. When rendering the scene, this texture can be projected onto the rendered polygons, and polygons whose distance to the light are further than the distance in the shadow texture are considered in shadow, and those whose distance is the same or closer are considered lit.

In one embodiment, the occluder surface is evaluated for a light source and the relevant depths are tracked using a z-buffer. A shadow rendering algorithm in accordance with one embodiment of the present invention is executed using one pass, and during this pass, depth information (e.g., regarding occluding surfaces, object surfaces, etc.) is generated for the light source. For example, as a 3 D scene is rendered, depth information is stored into the z-buffer using the light source as a view point. This computes depth information for those polygons that are visible to the light source.

Using this depth information, a penumbra map and occluder map are generated from the z-buffer. The penumbra map contains the z surface (e.g., depth information) of the penumbra, and the occluder map contains a copy of the z value (e.g., depth information) of the occluder that the corresponding penumbra z value was created from.

These maps are then projected into the scene. For example, in one embodiment, if a point is visible in view space, a coordinate transformation is used to map (x,y,z), the coordinates of the point, to (x',y',z'), the coordinates of the point in the light space (e.g., light point as a coordinate origin). The (x',y') are used to index the z-buffer, penumbra map and occluder map and the amount of light reaching that point is calculated based upon z', the penumbra distance, and the occluder distance.

Figure 7:
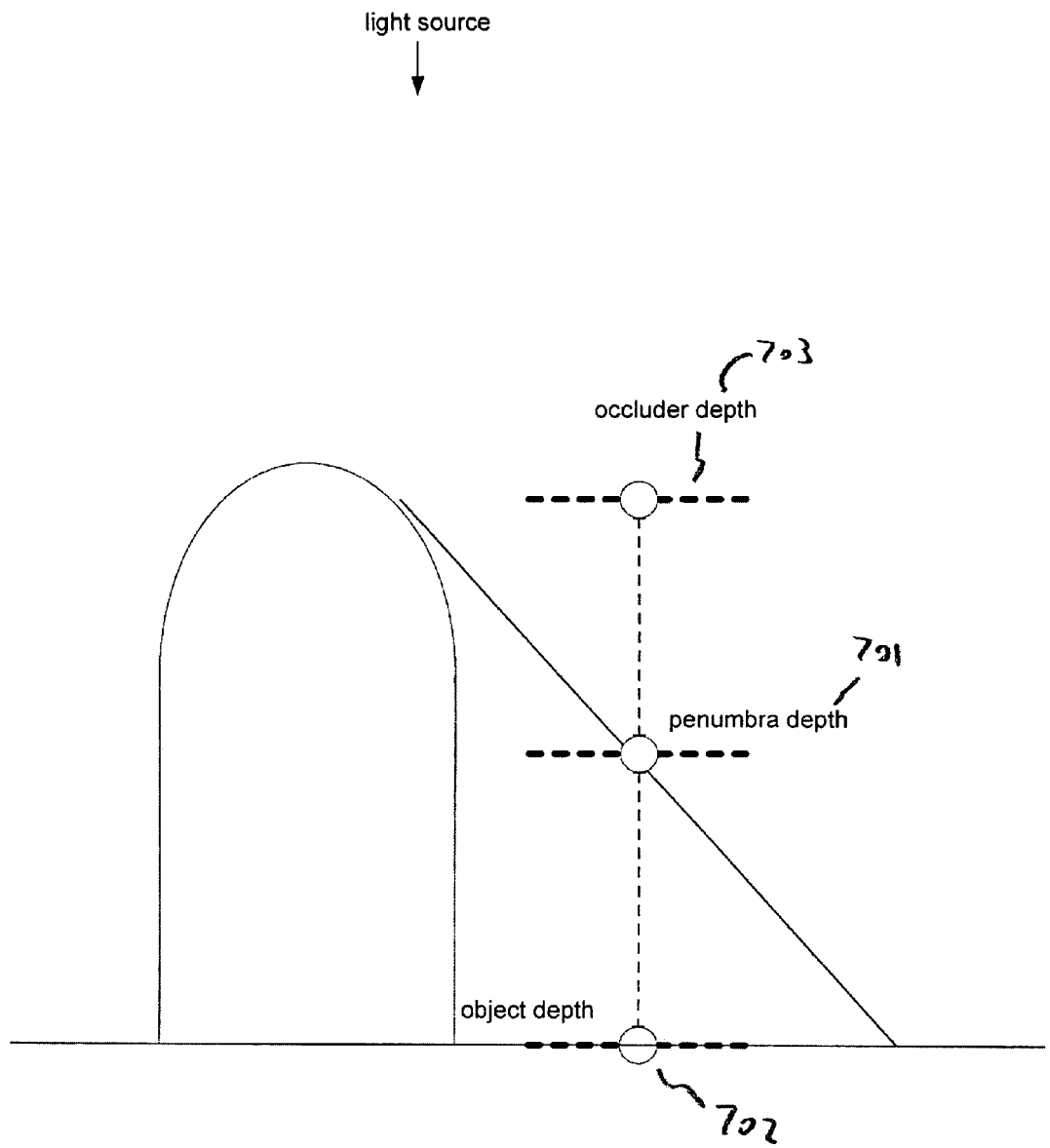
FIG. 7 shows a diagram depicting the calculation of a shadow region shading intensity in accordance with one embodiment of the present invention.

FIG. 7 shows a diagram depicting the calculation of a shadow region shading intensity in accordance with one embodiment of the present invention. In one embodiment, the shading intensity is calculated as a ratio of the difference between the penumbra depth 701 and the object depth 702 to the difference between the occluder depth 703 and the object depth 702.

It should be noted that this is different from other prior art z-buffer rendering methods which implement a simple binary choice based upon whether the z-buffer shadow depth is less than or greater than the object depth.

In one embodiment, the occluder surface is evaluated for each light source as follows. The penumbra map and the occluder map are first initialized by setting them equal to the z-buffer shadow map. The polygons of the objects of the scene are then evaluated by walking all pixels left to right, right to left, top to bottom, and bottom to top, and finding the closer of the current pixel's penumbra and the neighboring pixel's penumbra pushed back by some increment (e.g., some delta) and copying the neighbor's occluder depth if its modified penumbra was closer. In one embodiment, the increment is maintained constant across the scene. In another embodiment, the increment can be altered as a function of depth and image position and can yield penumbra surface generation of differing accuracies.

It should be noted that there are also other means by which the occluder and penumbra maps can be generated. In one embodiment, a search is performed for the best penumbra in a manner similar to the single sample soft shadow technique, except occluder information must also be maintained. Another possibility would be rendering geometry on the penumbra surface similar to the penumbra wedges technique, except that instead of rendering z and updating stencil, it would render z (the penumbra) and also the occluder depth generated by texturing the geometry with the z-buffer shadow map with texture coordinates from the projection of its generating edge into that map.

Figure 8:
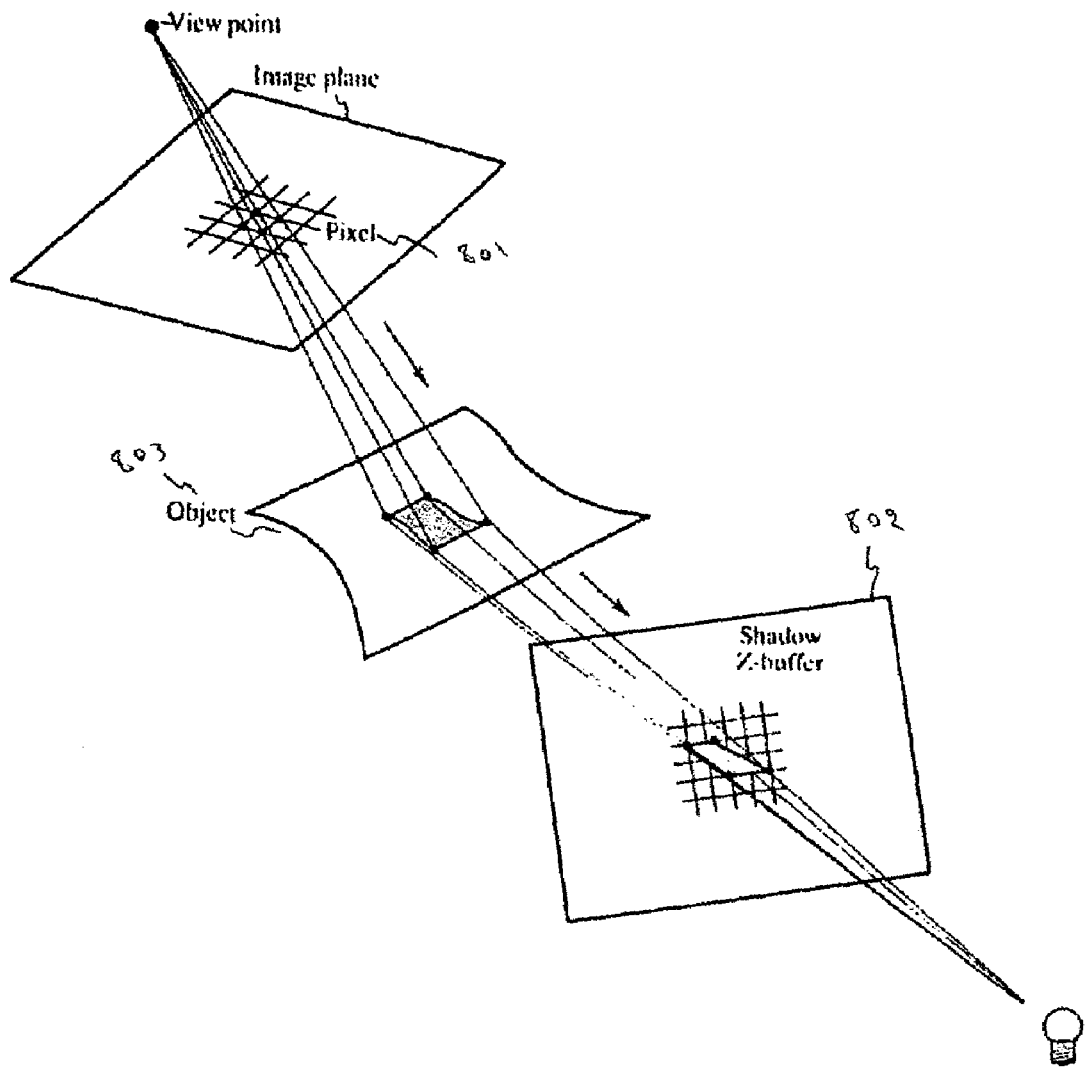
FIG. 8 shows a diagram depicting a shadow rendering algorithm in accordance with one embodiment of the present invention.

FIG. 8 shows a diagram depicting a manner of operation of a shadow rendering algorithm in accordance with one embodiment of the present invention. As depicted in FIG. 8, shadow z-buffer information 802, from the light space, is projected onto a pixel 801, from the view space, for the object 803.

In one embodiment, multiple penumbra surfaces (e.g., and therefore also multiple occluder surfaces) are stored. The best penumbra surface is in chosen based upon which of the penumbra surfaces shadows the object surface more (e.g., rather than which penumbra is closer to the light). In another embodiment, the faces of the penumbra shadow volume's are calculated independently, by looking at multiple neighbors, so that regions within the left penumbra shadow volume of one object and the right penumbra shadow volume of the other are independent and can correctly render.

In another embodiment, a 3 D scene is rendered four times using four passes, once per corner of a rectangular light, into four separate depth maps. Then four separate penumbra maps can be generated, where only two passes (or two penumbra faces) are needed, since the penumbras only extend in two directions (e.g., towards the center). This could allow for more accurate shadows, since more visibility information is available. This also allows light to wrap around occluding objects (e.g., occluders), which causes the umbra to shrink, as it should when the shadow softens.

In this manner, embodiments of the present invention clearly improve upon prior art z-buffer shadow rendering, in that embodiments of the present invention generate soft shadows with varying penumbra widths, rather than antialiased shadows with a fixed filter width. This more closely approximates the look of real world shadows, including the important visual cue of shadows that soften as the distance between occluder and partially occluded surface increases.

Figure 9:
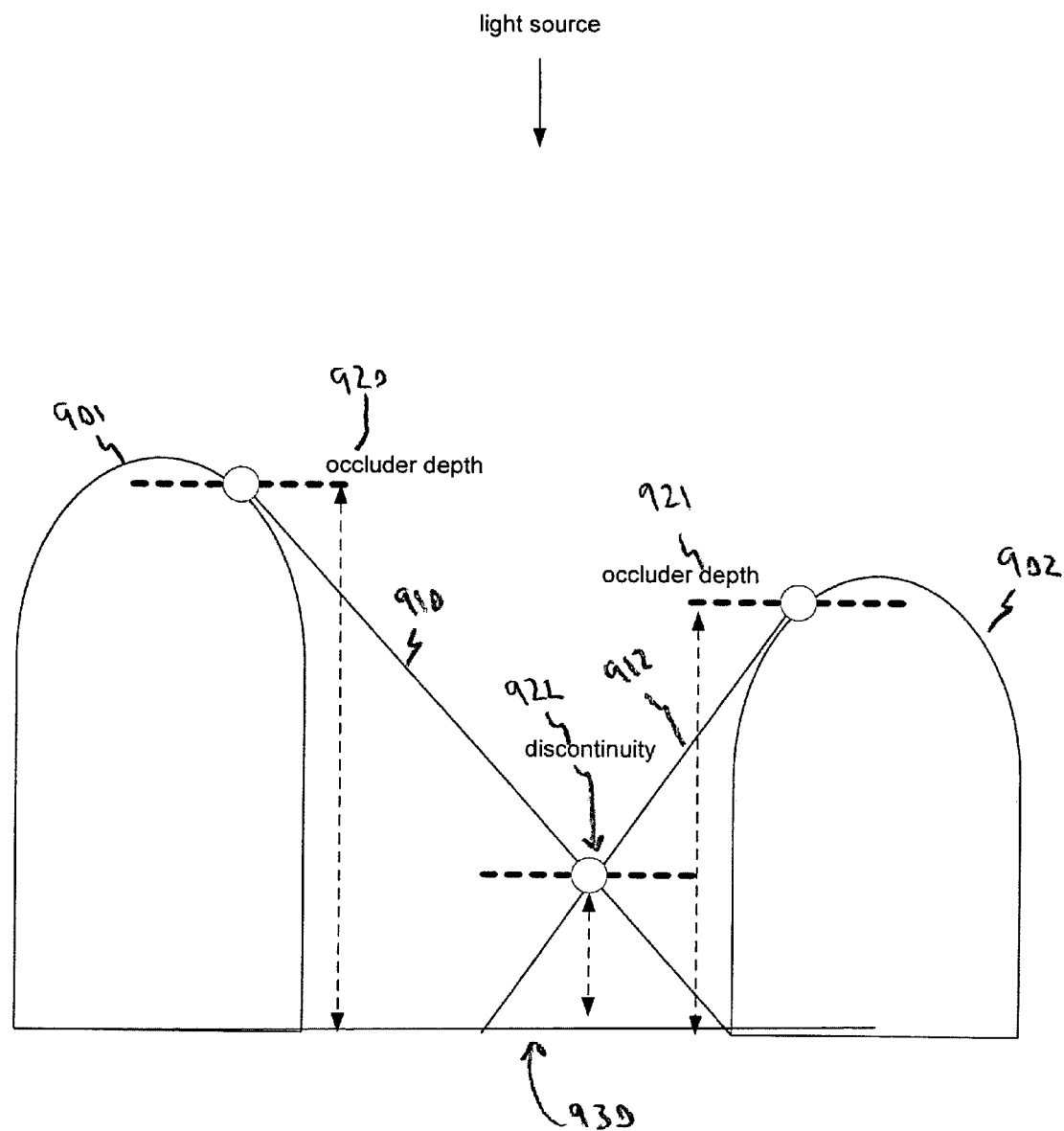
FIG. 9 shows a diagram of an overlapping penumbra scenario in accordance with one embodiment of the present invention.

FIG. 9 shows a diagram of an overlapping penumbra scenario in accordance with one embodiment of the present invention. As depicted in FIG. 9, a first object 901 and a second object 902 cast penumbra shadows from an area light source.

In one embodiment, multiple penumbra maps and occluder maps are stored and used to correctly render overlapping penumbras 910 and 912 shown in FIG. 9. The penumbra-occluder maps in accordance with the present invention have enough stored depth information (e.g., occluder depth 920 and occluder depth 921) to correctly render the overlapping penumbras 910-912, without creating a discontinuity 922, as the simplest embodiment does. As described above in the discussion of FIG. 7, the shading intensity for each object surface point is calculated as a ratio of the difference between the penumbra depth and the object depth to the difference between the occluder depth and the object depth. Accordingly, each penumbra makes its corresponding shading contribution to the object surface 930.

It should be noted that the penumbra maps and occluder maps produced by embodiments of the present invention are readily suited for combining shadows from statically rendered and dynamically rendered objects. This allows the mixing of static and dynamic objects, as well as lower and higher resolution maps in a given 3 D scene. In contrast, prior art penumbra wedge techniques are based upon stencil shadows, which have a different set of tradeoffs than z-buffer shadows, the main drawbacks being the cpu processing time (and programming difficulty) of finding the silhouettes of objects and generating geometry from the silhouettes, and the GPU requirements of rendering many (typically very large) polygons into the scene. Similarly, prior art layered shadow maps require enough rendering passes to achieve reasonable-looking soft shadows as to be no longer real-time for interesting 3 D scenes. Prior art single sample soft shadows techniques don't perform self-shadowing, which in contrast, is something which happens automatically with penumbra maps as implemented in embodiments of the present invention.

Additionally, it should be noted that prior art visibility channel based techniques can only render simple, low-resolution scenes in real-time, due to the process of reading back the depth buffer, generating a large amount of geometry therefrom, and then rendering all the geometry back into the scene. Simple prior art penumbra maps don't generalize well to rendering shrinking umbras, and don't properly shadow objects that weren't rendered into the shadow map. This means that multiple prior art penumbra maps from the same light source cannot be combined. So, for example, if penumbra maps were generated once for a static environment, and another penumbra maps was generated for an animated character moving through that environment, there's no easy way to combine the two penumbra maps, in contrast to the penumbra-occluder maps of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for rendering on a display a soft shadow with varying penumbra width in a 3D scene comprising:
generating a penumbra map using a z-buffer;
generating an occluder map using the z-buffer;
projecting the penumbra map and the occluder map into a 3D scene to render at least one shadow having a penumbra region and an umbra region on a display.

2. The method of claim 1 wherein the penumbra map comprises a z surface of the penumbra region.

3. The method of claim 1 wherein the occluder map comprises a z surface of an occluder that the z surface of the penumbra region was created from, whose values are depths of an occluder that generated corresponding penumbra depths.

4. The method of claim 1 further comprising:
performing a shading calculation to render the at least one shadow, wherein the shading calculation comprises a ratio of the difference between a penumbra depth and an object depth to the difference between an occluder depth and the object depth.

5. The method of claim 4 wherein the object depth corresponds to a light space depth.

6. The method of claim 1 further comprising:
generating the penumbra map by initializing the penumbra map to a z-buffer shadow map;
walking pixels of the shadow map to find the closer of a current pixel penumbra and a neighbor pixel penumbra; and
copying a neighbor pixel occluder if a modified penumbra for the neighbor pixel is closer to a light source than the current pixel.

7. The method of claim 1 further comprising:
generating the occluder map by initializing the occluder map to a z-buffer shadow map;
walking pixels of the shadow map to find an occluder depth that created the penumbra; and
copying a neighbor pixel occluder if a modified penumbra for the neighbor pixel is closer to a light source than the penumbra for the current pixel.

8. A system for rendering a soft shadow with varying penumbra width in a 3 D scene comprising:
a graphics processor; and
a memory coupled to the graphics processor and having computer readable code which when executed by the graphics processor cause the graphics processor to implement a method comprising:
generating a penumbra map using a z-buffer;
generating an occluder map using the z-buffer;
projecting the penumbra map and the occluder map into a 3 D scene to render at least one shadow having a penumbra region and an umbra region.

9. The system of claim 8 wherein the penumbra map comprises a z surface of the penumbra region.

10. The system of claim 8 wherein the occluder map comprises a z surface of an occluder that the z surface of the penumbra region was created from, whose values are depths of an occluder that generated corresponding penumbra depths.

11. The system of claim 8 further comprising:
performing a shading calculation to render the at least one shadow, wherein the shading calculation comprises a ratio of the difference between a penumbra depth and an object depth to the difference between an occluder depth and the object depth.

12. The system of claim 11 wherein the object depth corresponds to a light space depth.

13. The system of claim 8 further comprising:
generating the penumbra map by initializing the penumbra map to a z-buffer shadow map;
walking pixels of the shadow map to find the closer of a current pixel penumbra and a neighbor pixel penumbra; and
copying a neighbor pixel occluder if a modified penumbra for the neighbor pixel is closer to a light source than the current pixel.

14. The system of claim 8 further comprising:
generating the occluder map by initializing the occluder map to a z-buffer shadow map;
walking pixels of the shadow map to find an occluder depth that created the penumbra; and
copying a neighbor pixel occluder if a modified penumbra for the neighbor pixel is closer to a light source than the penumbra for the current pixel.

15. A method for rendering on a display a soft shadow with varying penumbra width, comprising:
generating a penumbra map using a z-buffer; generating an occluder map using the z-buffer;
projecting the penumbra map and the occluder map into a 3 D scene on a display; and
performing a shading calculation to render at least one shadow having a penumbra region and an umbra region in the 3 D scene, wherein the shading calculation comprises a ratio of the difference between a penumbra depth and an object depth to the difference between an occluder depth and the object depth.

16. The method of claim 15 further comprising:
generating multiple penumbra surfaces using the z-buffer;
generating multiple occluder surfaces using the z-buffer; and
calculating lighting values based upon the multiple penumbra surfaces and occluder surfaces, wherein rendering is based upon which of the multiple penumbra surfaces most completely shadows a z surface.

17. The method of claim 15 further comprising:

calculating multiple faces of a corresponding multiple penumbra regions independently, by looking at multiple neighbor penumbra regions, so that regions within a left penumbra of one object and a right penumbra of another object shadow without an artifact.

18. The method of claim 15 further comprising:

rendering a 3 D scene at least four times to generate four depth maps;

generating four penumbra maps therefrom, using two rendering passes to render the at least one shadow.

19. The method of claim 15 further comprising:

generating the penumbra map by initializing the penumbra map to a z-buffer shadow map;

walking pixels of the 3 D scene to find the closer of a current pixel penumbra and a neighbor pixel penumbra; and copying a neighbor pixel occluder if a modified penumbra for the neighbor pixel is closer to a light source than the current pixel.

20. The method of claim 15 further comprising:

generating the occluder map by initializing the occluder map to a z-buffer shadow map;

walking pixels of the 3 D scene to find the closer of a current pixel occluder and a neighbor pixel occluder; and copying a neighbor pixel occluder if a modified occluder for the neighbor pixel is closer to a light source than the current pixel.

* * * * *